Oct. 2, 1923.

P. JUERGENSEN

LEMON SQUEEZER

Filed Nov. 8, 1921

1,469,514

INVENTOR

Peter Juergensen

Patented Oct. 2, 1923.

1,469,514

UNITED STATES PATENT OFFICE.

PETER JUERGENSEN, OF DES MOINES, IOWA.

LEMON SQUEEZER.

Application filed November 8, 1921. Serial No. 513,641.

*To all whom it may concern:*

Be it known that I, PETER JUERGENSEN, a citizen of the United States, residing at Des Moines, in the county of Polk and State of Iowa, have invented certain new and useful Improvements in Lemon Squeezers, of which the following is a specification.

This invention relates to squeezers especially adapted for use in connection with lemons and other fruits.

An important object of this invention is to provide a lemon squeezer having novel means whereby the juice from a lemon may be thoroughly extracted from the lemon to dispense with the necessity of soiling one's hands.

A further object is to provide a lemon squeezer which is of highly simplified construction, neat in appearance and cheap to manufacture.

Other objects and advantages of the invention will be apparent during the course of the following description.

Figure 1:
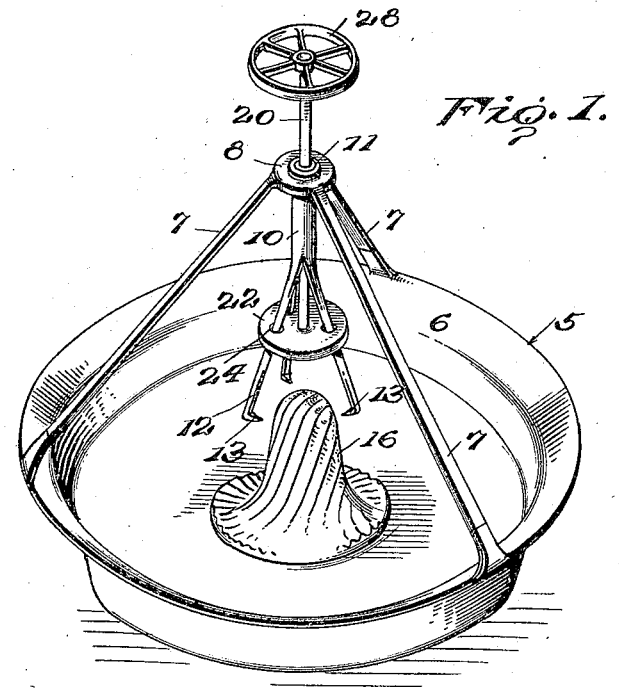

In the accompanying drawing forming a part of this application and in which like numerals are employed to designate like parts throughout the same, Figure 1 is a perspective of the improved lemon squeezer.

Figure 2:
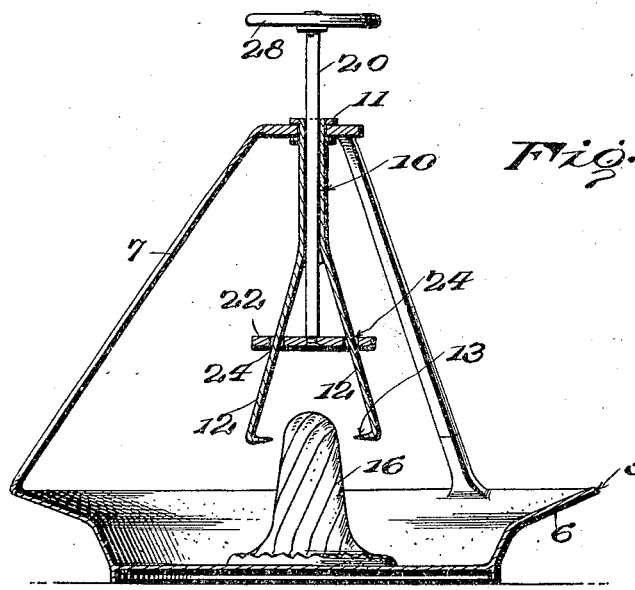

Figure 2 is a vertical sectional view through the same.

In the drawing wherein for the purpose of illustration is shown a preferred embodiment of the invention the numeral 5 generally designates a plate or dish having an upstanding rim 6 from which a plurality of rods 7 extend. The upper ends of the rods 7 are joined by a disk-shaped head 8 having its axis in alignment with the axis of the plate and provided with a centrally arranged opening which rotatably receives the upper portion of a tubular member 10. As illustrated in Figure 2 the tubular member 10 may be provided with spaced collars 11 which constitute a means for preventing the tubular member from partaking of endwise movement.

The lower portion of the tubular member 10 is provided with a plurality of longitudinal incisions defining diverging arms 12 having their lower portions provided with inwardly directed prongs 13 adapted to be engaged with the skin of a lemon so as to hold the lemon firmly in position. A suitably shaped knob or head 16 is mounted on the central portion of the plate and is provided with a plurality of spirally arranged ribs or corrugations constituting a means for removing the juice from the lemon when the lemon is forced downwardly and rotated.

The inwardly extending prongs 13 may be forced into engagement with the lemon or other fruit by means of an operating rod or stem 20 having its lower portion provided with a disk 22 having a series of openings 24 which slidably receive the arms 12. When the stem 20 is forced downwardly the disk 22 will force the arms inwardly to a limited degree into engagement with the lemon whereby the lemon is securely gripped. When the lemon has been securely gripped the stem 20 may be rotated by means of a hand wheel 28 so that the lemon will be rotated for thoroughly removing the juice from the same.

Upon removing the juice from the lemon, the hand wheel 28 is elevated for removing the prongs 13 from engagement with the lemon and a new piece of lemon may be placed upon the centrally arranged head 16.

Having thus described my invention, what is claimed is:—

1. A lemon squeezer comprising a dish having a plurality of upwardly extending rods and a disk-shaped head connecting the rods, a tubular member rotatably connected to the disk-shaped head and having a plurality of diverging arms provided with inwardly extending fruit engaging prongs, and a stem rotatably extended through said tubular member and having a disk provided with openings receiving said arms and constituting a means for moving the arms inwardly and for rotating the same.

2. A lemon squeezer comprising a dish having a plurality of upwardly extending rods and a disk-shaped head connecting the rods, a tubular member rotatably connected to the disk-shaped head and having a plurality of diverging arms provided with inwardly extending fruit engaging prongs, and a stem rotatably extended through said tubular member and having a disk provided with openings receiving said arms and constituting a means for moving the arms inwardly and for rotating the same, and a knob formed on said plate and having means adapted to remove the juice from the fruit.

3. A lemon squeezer comprising a plate having a plurality of upwardly extending rods, a rotatable member associated with said rods and hving fruit gripping means, and a disk associated with said fruit gripping means and having an operating stem provided with a hand wheel.

In testimony whereof, I have affixed my signature in the presence of two witnesses.

PETER JUERGENSEN.

Witnesses:
BEULAH McMICHAEL,
K. P. PATTORFF.